(12) United States Patent
Hebert et al.

(10) Patent No.: US 11,125,262 B2
(45) Date of Patent: Sep. 21, 2021

(54) THREAD FORMING AND THREAD LOCKING FASTENER

(71) Applicant: Research Engineering & Manufacturing, Inc., Middletown, RI (US)

(72) Inventors: Edmund A. Hebert, Mattapoisett, MA (US); Kenneth J. Gomes, Portsmouth, RI (US); Dennis O. Boyer, Lake Worth, FL (US); John R. Reynolds, South Dartmouth, MA (US); Bobby L. Budziszek, Middletown, RI (US)

(73) Assignee: Research Engineering & Manufacturing, Inc., Middletown, RI (US)

( * ) Notice: Subject to any disclaimer, the term of this patent is extended or adjusted under 35 U.S.C. 154(b) by 118 days.

(21) Appl. No.: 16/598,288

(22) Filed: Oct. 10, 2019

(65) Prior Publication Data

US 2021/0108664 A1 Apr. 15, 2021

(51) Int. Cl.
*F16B 39/30* (2006.01)
*F16B 25/00* (2006.01)
*F16B 37/00* (2006.01)
*F16B 39/284* (2006.01)

(52) U.S. Cl.
CPC ...... *F16B 25/0057* (2013.01); *F16B 25/0047* (2013.01); *F16B 25/0073* (2013.01); *F16B 37/005* (2013.01); *F16B 39/284* (2013.01)

(58) Field of Classification Search
USPC .................................................. 411/309, 416
See application file for complete search history.

(56) References Cited

U.S. PATENT DOCUMENTS

| | | | | |
|---|---|---|---|---|
| 2,293,930 A | * | 8/1942 | Braendel | F16B 25/0084 411/420 |
| 3,195,156 A | * | 7/1965 | Phipard, Jr. | F16B 25/0021 470/10 |
| 3,454,070 A | * | 7/1969 | Phipard, Jr. | F16B 39/30 411/168 |
| 3,472,119 A | * | 10/1969 | Peterson, Jr. | F16B 25/0047 411/422 |
| 3,504,722 A | | 4/1970 | Breed | |
| 3,643,543 A | * | 2/1972 | Gutshall | F16B 25/0047 411/418 |

(Continued)

OTHER PUBLICATIONS

PCT Notification of Transmittal of the International Search Report and the Written Opinion of the International Searching Authority, or the Declaration, International Searching Authority, International Application No. PCT/US2020/054474, dated Feb. 8, 2021, 11 pages.

*Primary Examiner* — Gary W Estremsky
(74) *Attorney, Agent, or Firm* — Cesari and McKenna, LLP

(57) ABSTRACT

A combined thread forming and thread locking fastener is disclosed. A fastener includes three thread zones. A first thread zone utilizes a first thread forming thread profile with an increasing outer diameter. A second thread zone extends from the end of the first zone utilizing the first thread forming thread profile and continues with a constant diameter. The third thread zone utilizes a thread locking thread profile continuing along substantially the remainder of the shaft of a fastener.

12 Claims, 13 Drawing Sheets

(56) References Cited

U.S. PATENT DOCUMENTS

| | | | | |
|---|---|---|---|---|
| 3,875,780 A * | 4/1975 | Cochrum | ............ | F16B 25/0078 |
| | | | | 72/90 |
| 3,934,444 A * | 1/1976 | Simons | .................. | B21H 3/027 |
| | | | | 72/88 |
| 3,939,512 A * | 2/1976 | Thurston | ............. | F16B 25/0047 |
| | | | | 470/10 |
| 4,194,430 A * | 3/1980 | Muenchinger | ......... | B21H 3/027 |
| | | | | 411/415 |
| 4,315,340 A * | 2/1982 | Veldman | .................. | B21H 3/02 |
| | | | | 411/416 |
| 4,820,098 A | 4/1989 | Taubert et al. | | |
| 5,842,923 A * | 12/1998 | Umemura | ........... | F16B 25/0047 |
| | | | | 470/10 |
| 6,089,806 A * | 7/2000 | Reynolds | ................. | B21K 1/46 |
| | | | | 411/386 |
| 7,722,304 B2 | 5/2010 | Pritchard | | |
| 9,404,524 B2 * | 8/2016 | Pritchard | ................ | F16B 33/02 |
| 2012/0251264 A1 * | 10/2012 | Taylor | ................. | F16B 25/0021 |
| | | | | 411/190 |
| 2016/0201711 A1 * | 7/2016 | Lard | .................... | F16B 25/103 |
| | | | | 411/386 |

\* cited by examiner

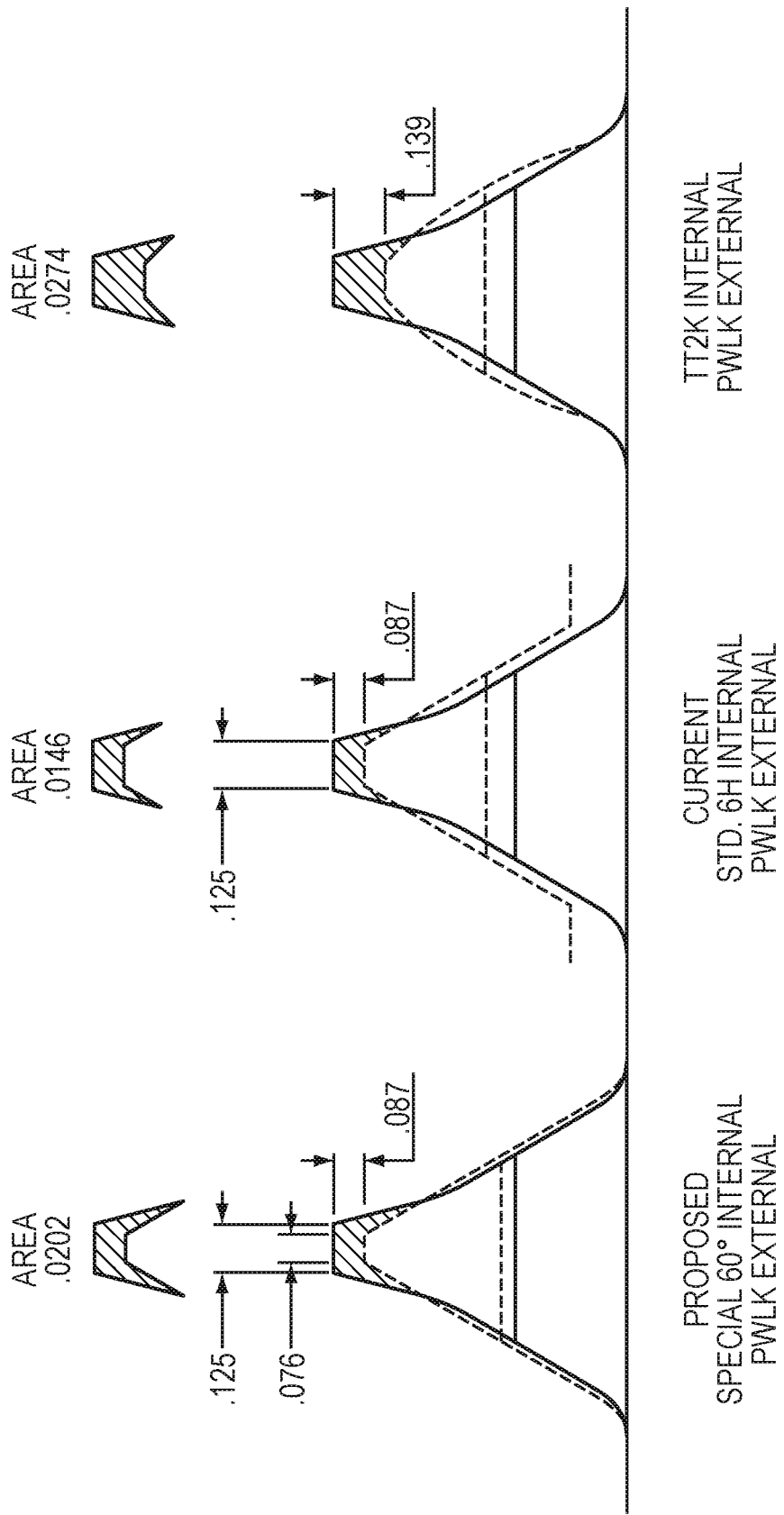
FIG. 5A — PROPOSED SPECIAL 60° INTERNAL PWLK EXTERNAL
FIG. 5B — CURRENT STD. 6H INTERNAL PWLK EXTERNAL
FIG. 5C — TT2K INTERNAL PWLK EXTERNAL

THREAD FORMING AND THREAD LOCKING FASTENER

BACKGROUND

Technical Field

The present invention relates to threaded fasteners.

Background Information

Conventional threaded fasteners (e.g., screws or bolts) may be designed to have a self-tapping thread forming action. One example of such a self-tapping fastener is described in U.S. Pat. No. 9,404,524, entitled High Performance Thread Rolling Screw/Bolt For Use in An Unthreaded Nut Anchor, by Alan Pritchard, the contents of which are hereby incorporated by reference.

Other conventional fasteners may include a thread locking mechanism that may be achieved by, e.g., mechanical interference between the fastener and a nut member. An exemplary thread locking fastener is described in U.S. Pat. No. 7,722,304, entitled Fastener and Fastener Assembly, by Alan Pritchard, the contents of which are hereby incorporated by reference.

A noted disadvantage of prior art fasteners is that they are optimized for either thread forming or thread locking, but not both. This causes users to make decisions as to which feature is more important for a particular application, which may result in sub-optimal application of such fasteners

SUMMARY

The disadvantages of the prior art overcome providing an exemplary fastener that is optimized for both thread forming and thread locking. The fastener comprises two separate thread profiles distributed into three zones along the shaft of the fastener. A first zone, which utilizes a thread forming thread profile, is immediately adjacent to the entry point of the fastener. Along the first zone the outer diameter of the thread profile increases along the first, e.g., 2-5 pitches. The second zone transitions from the first zone and utilizes the same thread forming thread profile as the first zone, but maintains a constant outer thread diameter. The second zone extends for, e.g., 2-3 pitches beyond the first zone. The third zone, which utilizes a thread locking thread profile, also maintains a constant outer diameter.

In accordance with illustrative embodiments of the present invention, the first and second thread profiles may be selected to complement each other to achieve a desired level of mechanical interference, i.e., thread locking. Further, by utilizing the present invention, the second thread profile (thread locking) may be optimized to work with the threads created by the first thread profile (thread forming). This may result in an optimized thread locking mechanism.

BRIEF DESCRIPTION OF THE DRAWINGS

The above, and further advantages of embodiments of the present the invention may be understood in relation to the accompanying drawings in which like reference numerals indicate identical or functionally identical elements, of which:

FIG. 5A is a cross-sectional view illustrating the interference between the threads of a nut member and a fastener in accordance with an illustrative embodiment of the present invention;

FIG. 5B is a cross-sectional view illustrating the interference between the threads of a nut member and a fastener in accordance with an illustrative embodiment of the present invention;

FIG. 5C is a cross-sectional view illustrating interference between the threads of a nut member and a fastener in accordance with an illustrative embodiment of the present invention;

DETAILED DESCRIPTION OF AN ILLUSTRATIVE EMBODIMENT

Figure 1:
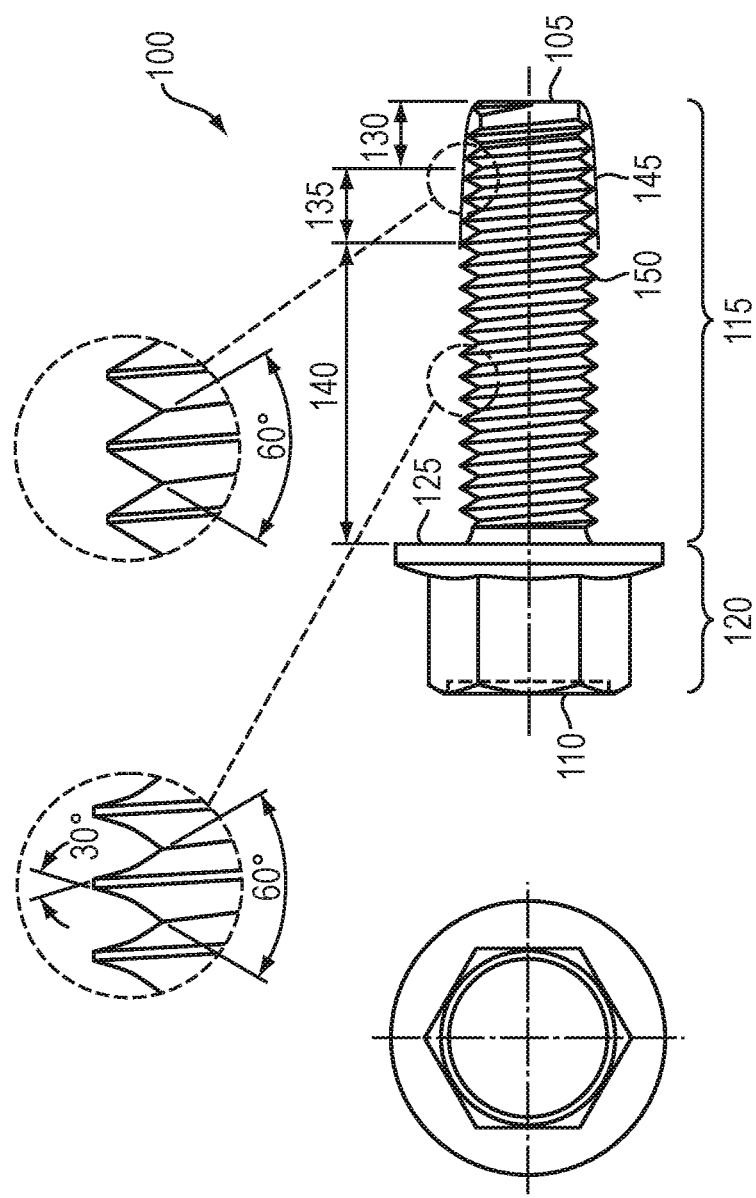
FIG. 1A is a side view of an exemplary fastener in accordance with an illustrative embodiment of the present invention.
FIG. 1B is a view of the head of an exemplary fastener viewed along the long axis in accordance with an illustrative embodiment of the present invention.
FIG. 1C is the view of an exemplary entry point of an exemplary fastener viewed along the long axis in accordance with an illustrative embodiment of the present invention.

FIG. 1A is a cross-sectional view of an exemplary thread forming and thread locking fastener 100 in accordance with an illustrative embodiment of the present invention. The fastener 100 includes an entry point 105 and a head 110 with a shaft 115 extending therebetween. Illustratively, entry point 105 is illustrated as having a substantially flat end. However, it should be noted that in alternative embodiments of the present invention, the fastener 100 may have an entry point 105 that is rounded, pointed, etc. As such, the description of entry point 105 being substantially flat should be taken as exemplary only. Head 110 is illustratively shown as having a hexagonal shape for use with a driving apparatus for insertion. Head 110 extends for some length 120 in the same axis of the shaft 115 to enable a driver, e.g., a wrench, etc. to engage the head 110 to exert torque on the fastener for insertion of the fastener into a nut member (not shown). Head 110 includes a substantially flat bottom 125 that is designed to rest flush with a nut member (not shown) when the fastener is fully inserted. As will be appreciated by those skilled in the art, head 110 may have a plurality of differing shapes based on the desired driving apparatus. Therefore, the description of head 110 having a hexagonal shape should be taken as exemplary only.

The body or shaft 115 of the fastener 100 includes a plurality of zones of threads including, for example, a first zone 130, a second zone 135, and a third zone 140. Illustratively, the three zones are utilized to both perform a thread forming function as well as a thread locking function once the fastener has been inserted into a nut member. The first zone 130 is illustratively approximately 2-5 pitches long of an exemplary first thread profile angling outward from the core with an increasing diameter as the zone moves away from the entry point 105 of the fastener. That is, the outer diameter of the first zone 130 is smallest at entry point 105 and enlarges as the threads move towards head 110 along the shaft 115. The second zone 135 illustratively comprises an additional 1-3 pitches of the first (thread forming) thread profile but with a substantially constant outer diameter. As is illustrated in FIG. 1A, the first thread profile illustratively comprises a substantially 60° angled thread profile cross section. In exemplary embodiments, the first thread profile may comprise that described in the above-incorporated U.S. Pat. No. 9,404,524. It should be noted that while a particular thread forming thread profile is shown and described, the principles of the present invention may utilize any thread forming thread profile in alternative embodiments of the present invention. Therefore, the particular thread forming thread profile shown and described herein should be taken as exemplary only.

The third zone 140 utilizes a second thread profile, which is illustratively a thread locking thread profile. As is illustrated in FIG. 1A, the exemplary second thread profile comprises a 60° angled thread at the base of the thread that transitions to a 30° angled thread at the tip. An exemplary thread locking thread profile is described in the above-incorporated U.S. Pat. No. 7,722,304. It should be noted that while a particular thread locking profile is shown and described, the principles of the present invention may utilize any thread locking thread profile in alternative embodiments of the present invention. Therefore, the particular thread locking thread profile shown and described herein should be taken as exemplary only.

Thus, in operation, when a fastener 100 in accordance with an illustrative embodiment of the present invention is inserted into a nut member, the threads of the first zone engage the nut member as the fastener is initially inserted. The first and second zone threads deform the nut member to create threads. Upon continued insertion of the fastener into the nut member, the threads of the third zone engage the newly created threads to induce mechanical interference, which causes a locking mechanism to occur. Illustratively, the second thread profile is chosen to compliment the first thread profile. In accordance with alternative embodiments of the present invention, the two thread profiles may be selected so that the thread locking profile (the second thread profile) is designed with the a priori knowledge of the dimensions of the threads created in a nut member by the thread forming profile (the first thread profile). As the fastener is creating the internal threads in an unthreaded nut member, the thread locking profile threads may be configured for optimized performance with the internal threads. Examples of variations are described below in relation to FIGS. 4A, B, C and 5A, B, C.

FIG. 1B is an exemplary view of the head 110 of the fastener 100 viewed along the long axis of the fastener in accordance with an illustrative embodiment of the present invention. As noted above, the illustration and description of exemplary head having a hexagonal shape should be taken as exemplary only. FIG. 1C is a view of the fastener 100 from the entry point 105 along the long axis of the fastener in accordance with an illustrative embodiment of the present invention. As can be appreciated from FIG. 1C, the shaft 115 of the fastener is illustratively shaped having a plurality, e.g., three lobes, in cross section. It should be noted that the use of a multi-lobed shaft is exemplary only and the principles of the present invention may be utilized with fasteners having shafts that are substantially circular. As will be appreciated by those skilled in the art, various types of fastener shaft cross sections may be utilized to achieve desired properties of the fastener. More particularly, it is expressly contemplated that shafts having more than three lobes may be utilized in accordance with alternative embodiments of the present invention. Further, in alternative embodiments, the shaft may have a varying cross section. For example, the shaft may have a substantially circular cross sectional area close to the entry point, but transition to a non-circular cross sectional area along the length of the shaft. An exemplary non-circular cross sectional area would be, e.g., a three-lobed cross sectional area. However, it is expressly contemplated that other forms on substantially non-circular cross sectional areas may be utilized in accordance with alternative embodiments of the present invention. The principles of the present invention may be utilized with a wide range of fastener shaft 115 cross sectional shapes in order to achieve desired functionality.

Figure 2:
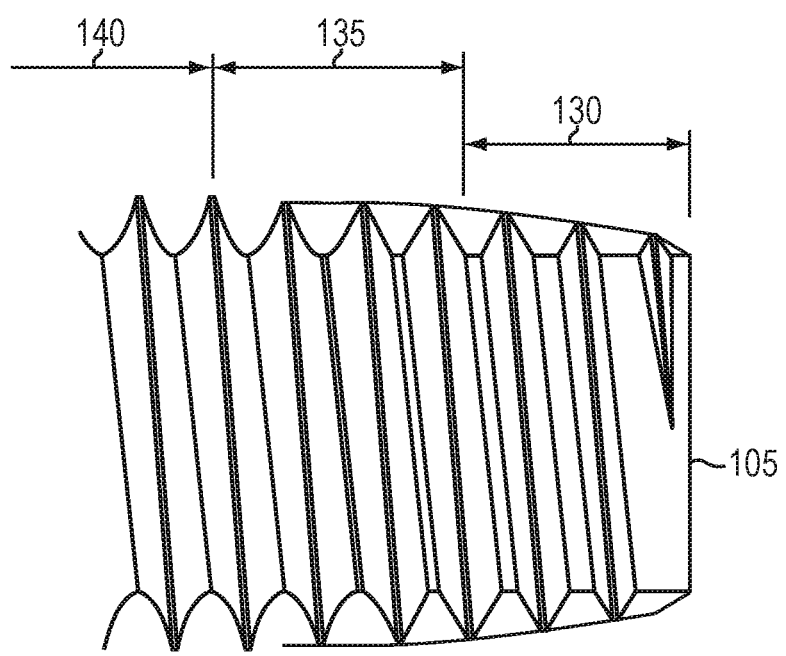
FIG. 2 is an enlarged view of the entry point end of an exemplary fastener in accordance with an illustrative embodiment of the present invention.

FIG. 2 is an enlarged view of the entry point end of a fastener 100 in accordance with an illustrative embodiment of the present invention. As can be seen from FIG. 2, the first zone 130 increases in outer diameter as it moves from the entry point 105. The first zone utilizes a first thread profile, which is illustratively a thread forming thread profile. The second zone 135 continues the use of the thread forming threads, but at an overall diameter that is substantially constant, unlike the first zone 130 which has an increasing overall thread diameter. The third zone 140 then utilizes a second thread profile, e.g., a thread locking thread profile, for the remainder of the fastener 100.

Figure 3:
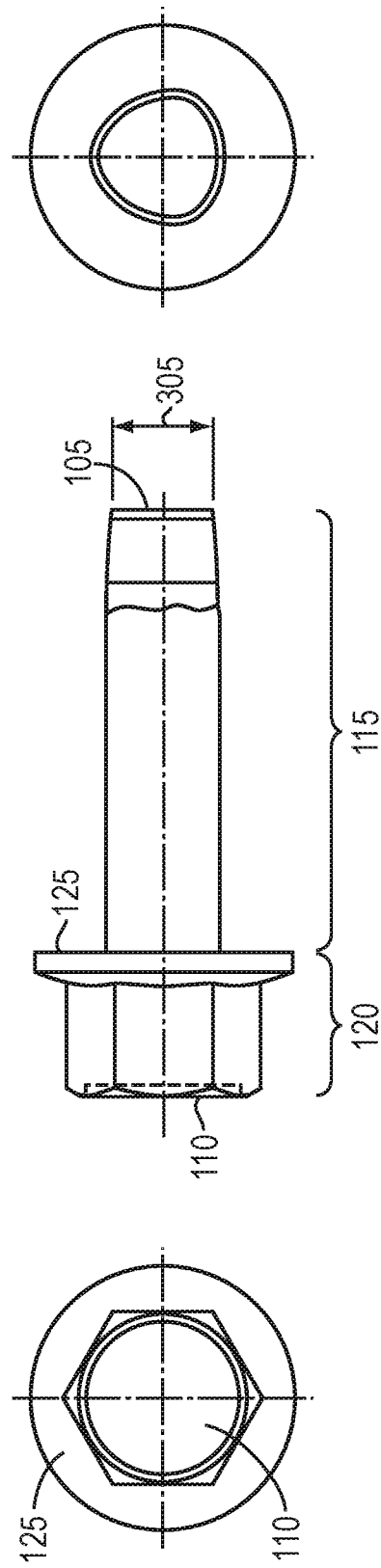
FIG. 3 is illustrative views of an exemplary blank for use in forming a fastener in accordance with an illustrative embodiment of the present invention.

FIG. 3 is an exemplary view of a headed blank 300 for use in forming a fastener 100 in accordance with an illustrative embodiment of the present invention. Illustratively, the blank 300 comprises a single diameter blank, which eases manufacturing difficulty. However, it is expressly contemplated that the principles of the present invention may be utilized with more sophisticated blanks.

Figure 4A:
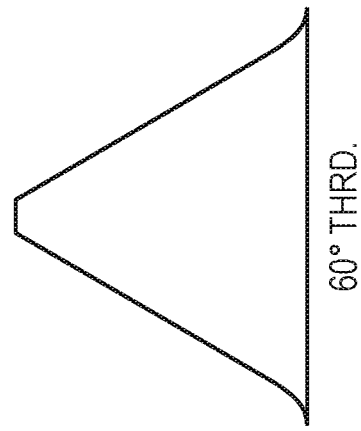
FIG. 4A is a cross-sectional view of an exemplary thread profile in accordance with an illustrative embodiment, the present invention.
Figure 4B:
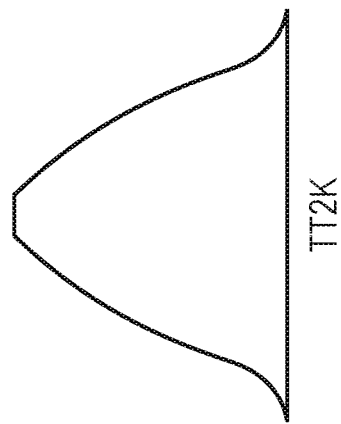
FIG. 4B is a cross-sectional view of an exemplary thread profile in accordance with an illustrative embodiment of the present invention.
Figure 4C:
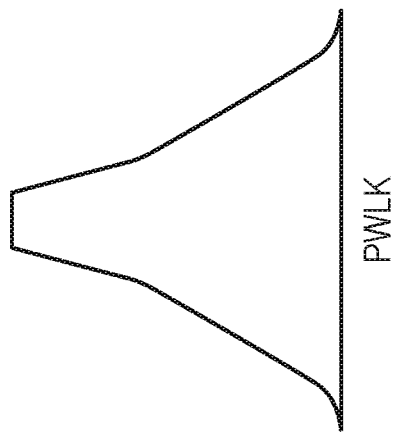
FIG. 4C is a cross-sectional view of an exemplary thread profile in accordance with an illustrative embodiment of the present invention.

FIGS. 4A, B, C illustrate illustrative thread profiles that may be utilized in alternative embodiments of the present invention. It should be noted that each thread profile has the same cross-sectional area. FIG. 4A is representative of an illustrative 60° thread profile, such as that shown in FIG. 1. FIG. 4B is representative of an exemplary radius thread profile. FIG. 4C is representative of an exemplary angular thread form with a 60°/30° thread profile. It should be noted that in alternative embodiments of the present invention, differing thread profiles may be utilized. Therefore, it is expressly contemplated that the thread profiles shown in FIGS. 4A, B, C are exemplary only.

FIGS. 5A, B, C illustrate exemplary ranges of potential mechanical interference that may be obtained by utilizing differing thread profiles for nut members and fasteners in accordance with exemplary design choices in accordance with illustrative embodiments of the present invention. The various figures show combinations of thread profiles described above in relation to FIGS. 4A, B, C. As can be seen from FIGS. 5A, B, and C, by varying the internal and external thread profiles, varying degrees of mechanical interference can be achieved. In alternative embodiments, by selecting various combination of thread profiles, a desired amount of mechanical interference may be achieved.

Figure 6:
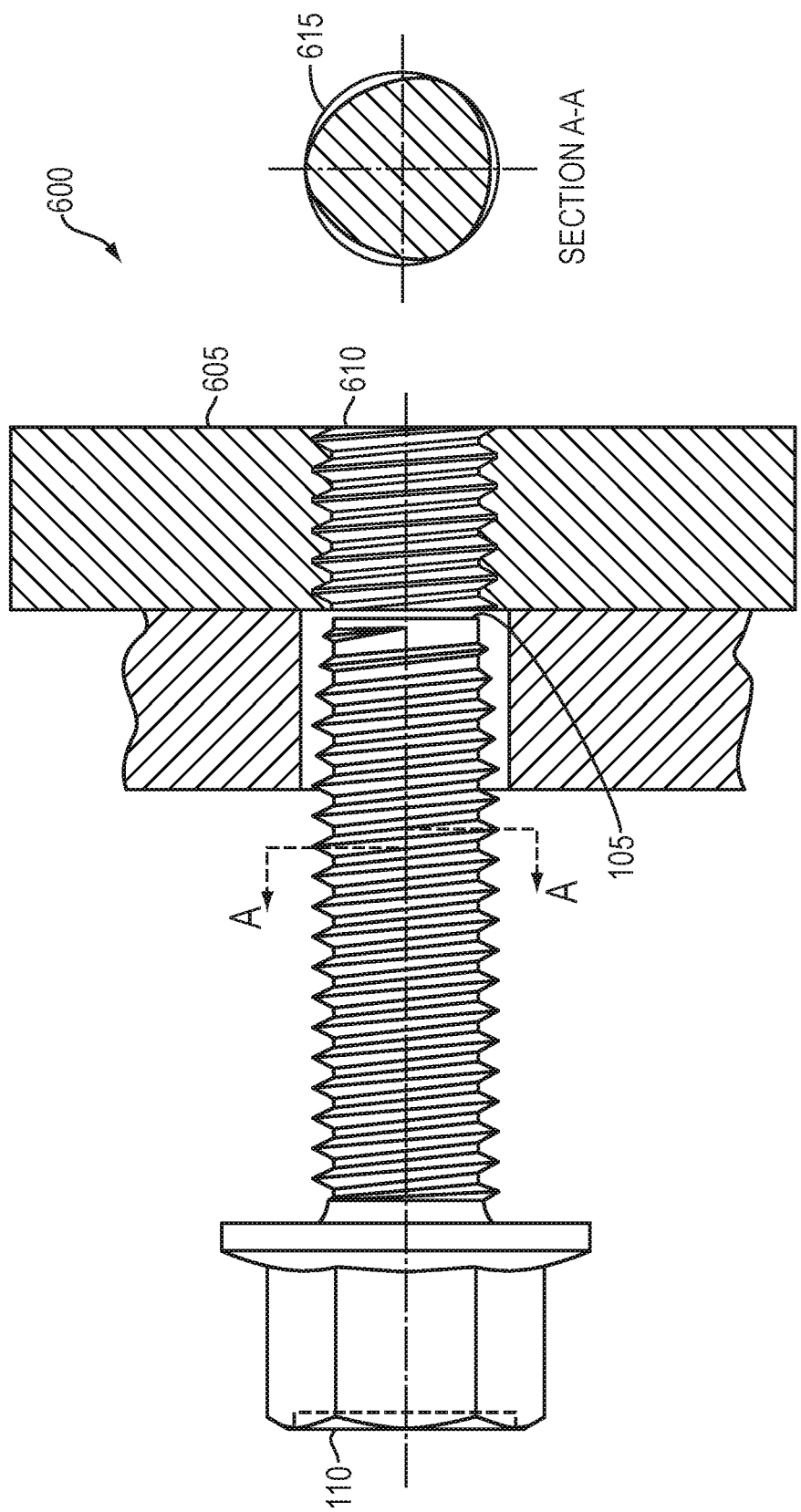
FIG. 6 is a cross-sectional view illustrating the insertion of an exemplary fastener into a threaded nut member in accordance with an illustrative embodiment of the present invention.

FIG. 6 is a cross-sectional view 600 of the insertion of a fastener 100 into a threaded nut member 605 in accordance with an illustrative embodiment of the present invention. The threaded nut member 605 illustratively includes a set of preformed threads 610. View 600 is of the fastener 100 and nut 605 immediately prior to insertion of the end 105 of the fastener 100 into the threaded nut member 605. The view along section A-A illustrates an exemplary cross section 615 of fastener 100 and the threaded nut member.

Figure 7:
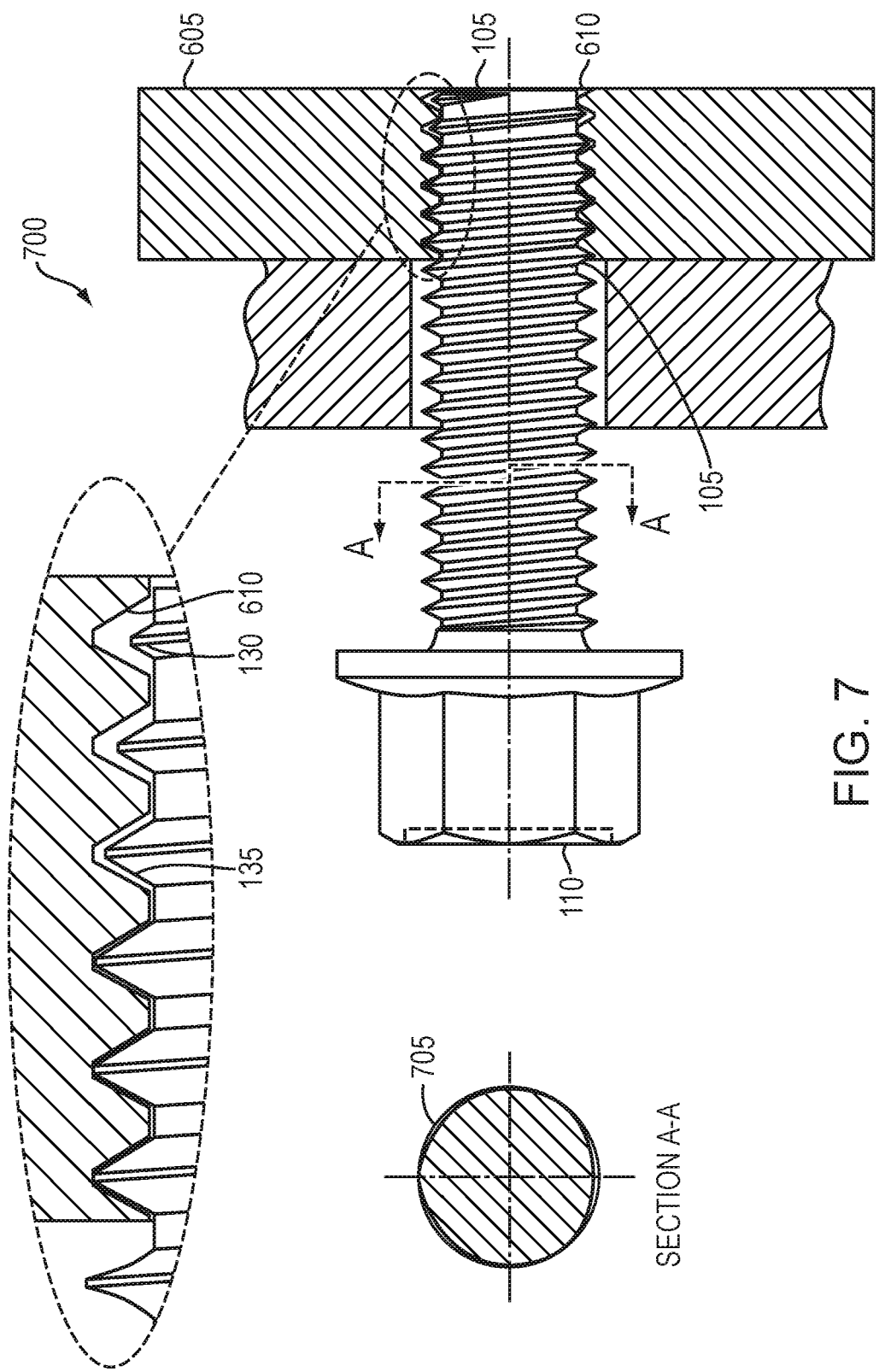
FIG. 7 is a cross-sectional view illustrating the insertion of a fastener into a threaded nut member in accordance with an illustrative embodiment of the present invention.

FIG. 7 is a cross-sectional view 700 of the insertion of a fastener 100 into a threaded nut member 605 in accordance with an illustrative embodiment of the present invention. In view 700, the first 130 and second 135 zones of the fastener 100 have been inserted into the threaded nut member 605. As can be seen in the enlarged view, space is left between the first and second zone threads and the internal threads 610 of the threaded nut member 605.

Figure 8:
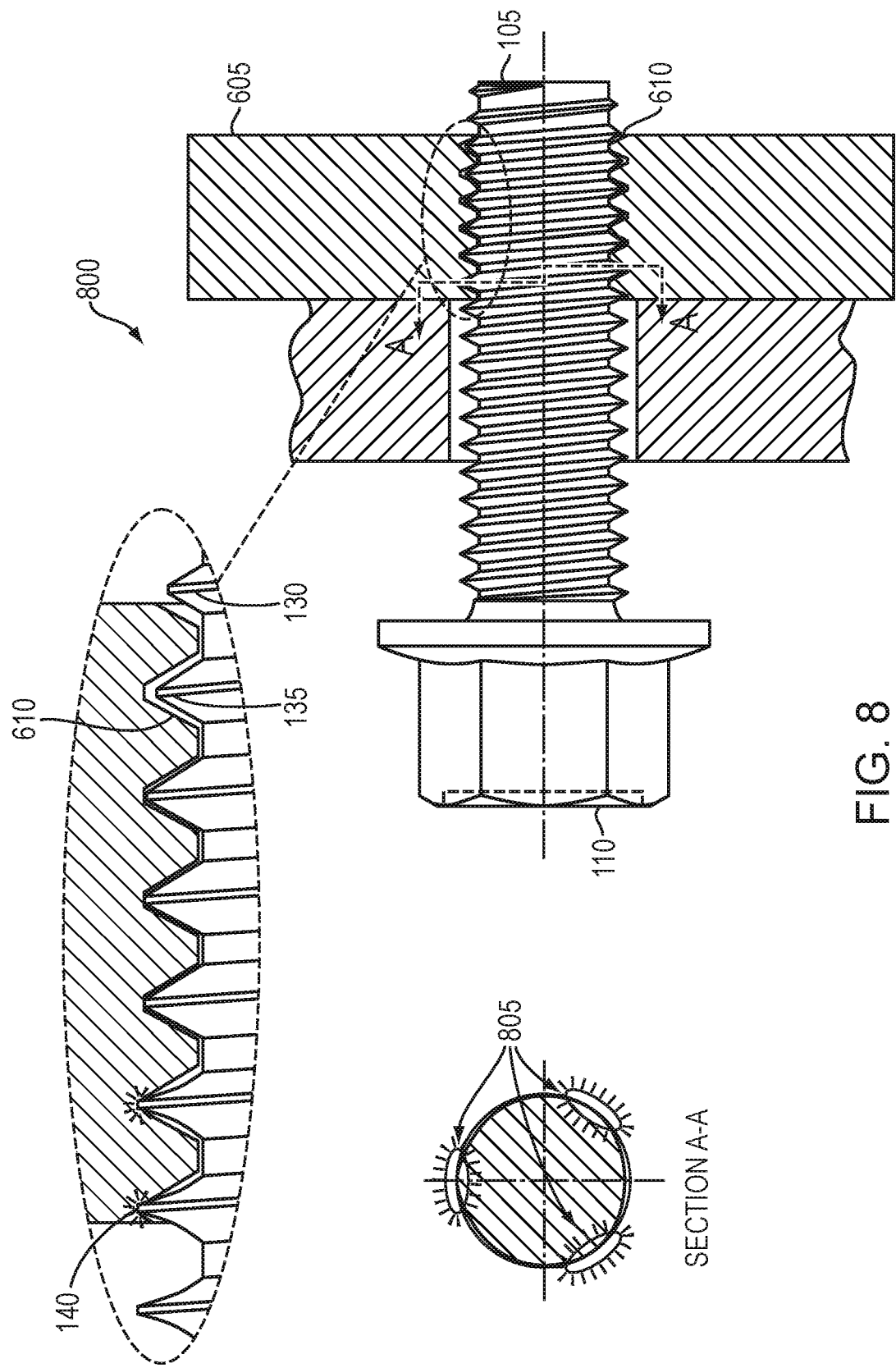
FIG. 8 is a cross-sectional view illustrating the insertion of a fastener into a threaded nut member in accordance with an illustrative embodiment of the present invention.

FIG. 8 is a cross-sectional view 800 of the insertion of a fastener 100 into an unthreaded nut member in accordance with an illustrative embodiment of the present invention. In view 800, the first zone threads 130 have nearly passed through the threaded nut member 605, while the second zone threads 135 are completely contained within the nut member 605. As can be seen, the third zone threads 140 have generated tip penetration at points 805 within the nut member.

Figure 9:
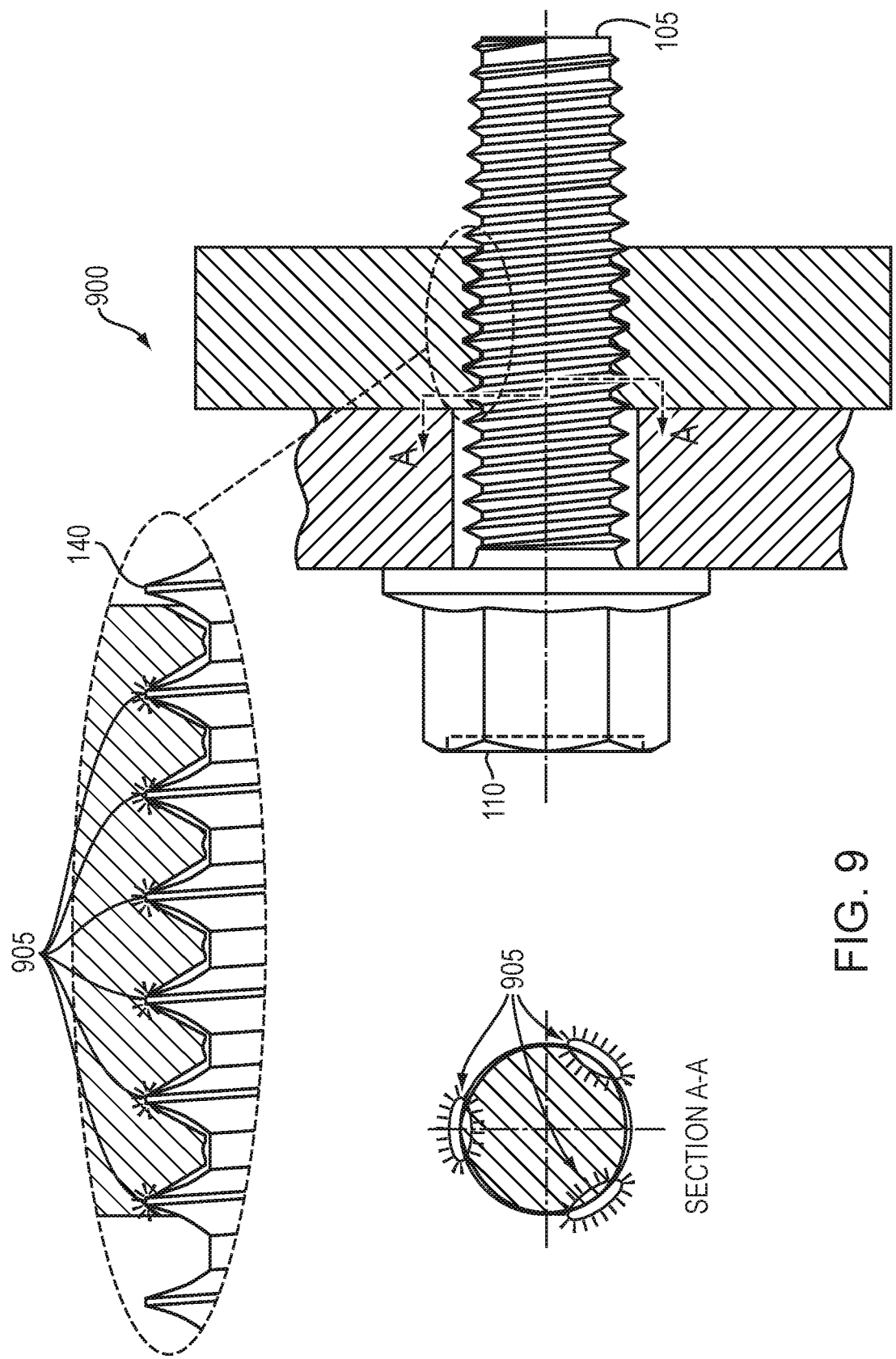
FIG. 9 is a cross-sectional view illustrating the insertion of a fastener into a threaded nut member in accordance with an illustrative embodiment of the present invention.

FIG. 9 is a cross-sectional view 900 of the insertion of a fastener 100 into a threaded nut member 605 in accordance with an illustrative embodiment of the present invention. In view 900, the first 130 and second zone threads 135 have passed completely through the nut member 605 and for each internal thread 605, there are tip penetration points 905 of the third zone threads 140. With the faster 100 inserted as shown in FIG. 9, the points of tip penetration 905 generate a mechanical locking mechanism, thereby working to secure the fastener in the threaded nut member.

In an illustrative embodiment of the present invention, the thread forming thread profile of the first and second zone threads are designed so as to slightly enlarge the diameter of the threads of the threaded nut member. This resizing enables the fastener to be constructed so that there is an optimized interference between the resized threads and the thread locking threads of the third zone threads. By selecting the thread profile and size for the first and second zone threads, the desired amount of mechanical interference with the third zone threads may be achieved. However, it should be noted that in alternative embodiments of the present invention, the preformed internal threads are not enlarged by the first and second zone threads. Therefore, the description of the internal threads being enlarged should be taken as exemplary only.

Figure 10:
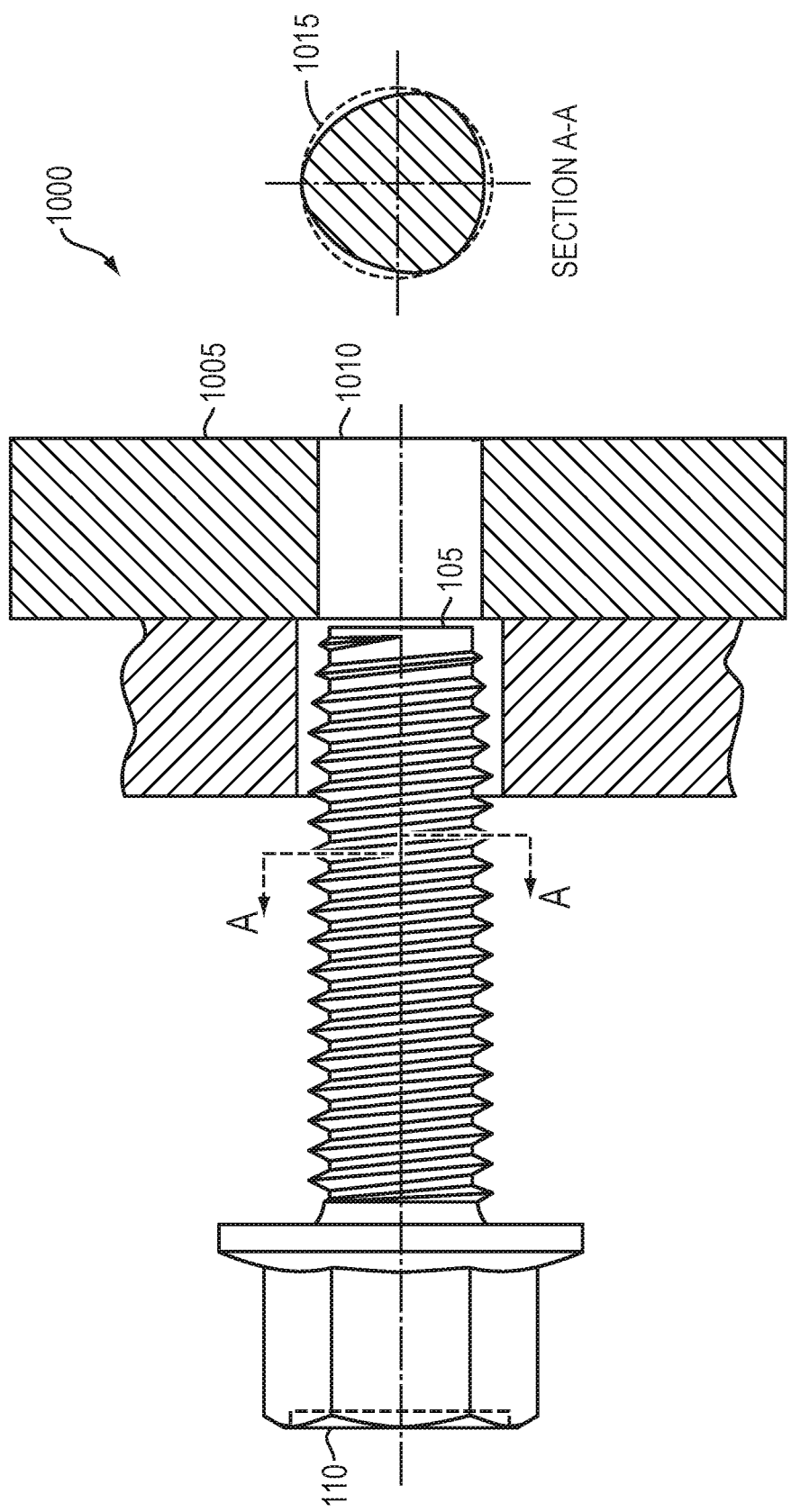
FIG. 10 is a cross-sectional view illustrating the insertion of fastener into an unthreaded nut member in accordance with an illustrative embodiment of the present invention.

FIG. 10 is a cross-sectional view 1000 of the insertion of a fastener 100 into an un-threaded nut member 1005 in accordance with an illustrative embodiment of the present invention. In view 1000, the fastener 100 is that about to be inserted into a nut member 1005, which has an un-threaded aperture or hole 1010.

Figure 11:
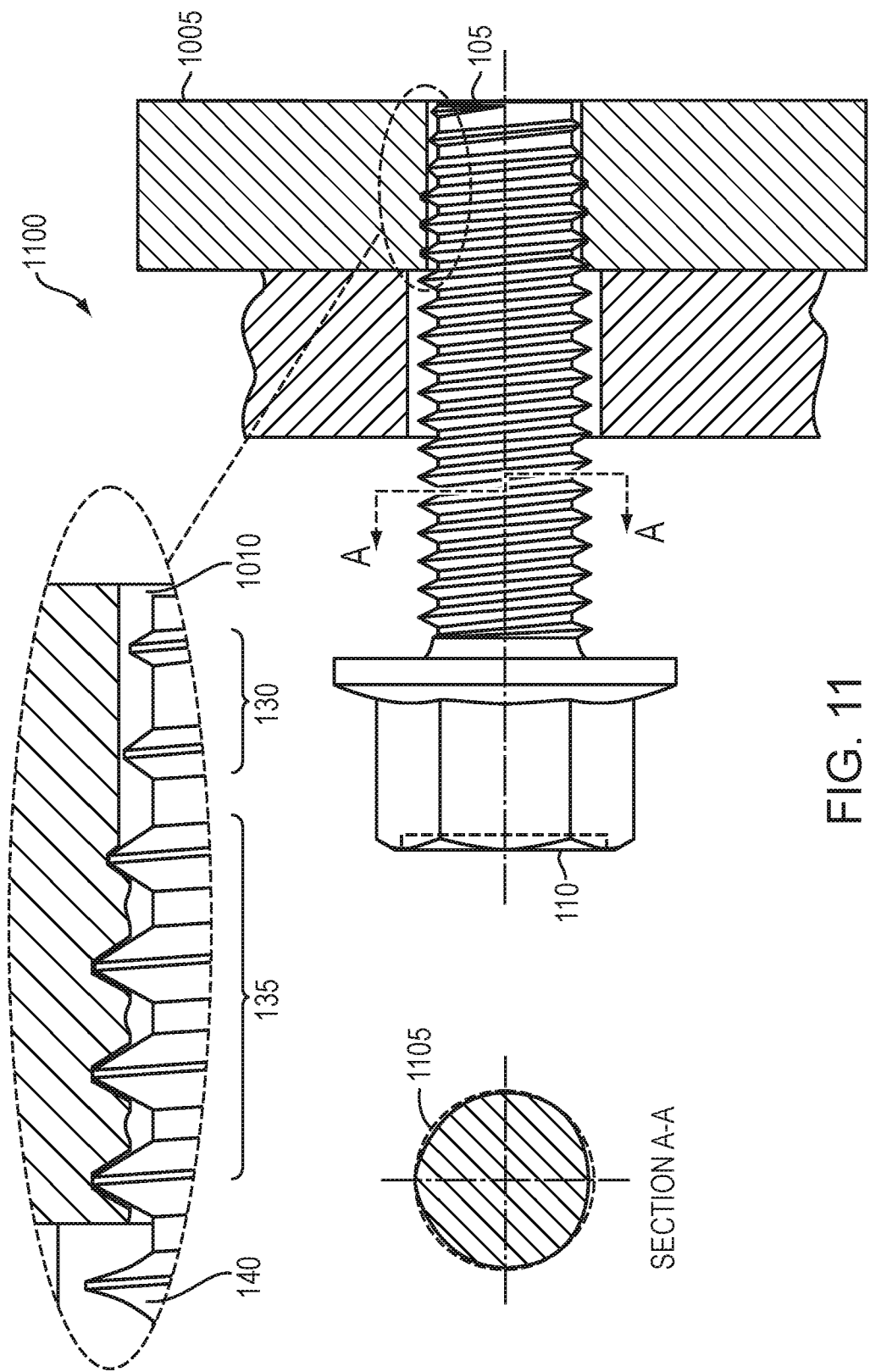
FIG. 11 is a cross-sectional view illustrating the insertion of a fastener into an unthreaded nut member in accordance with an illustrative embodiment of the present invention.

FIG. 11 is a cross-sectional view 1100 of the insertion of a fastener 100 into an unthreaded nut member 1005 in accordance with an illustrative embodiment of the present invention. View 1100 shows when the first and second zone threads have been inserted into the unthreaded nut member completely.

Figure 12:
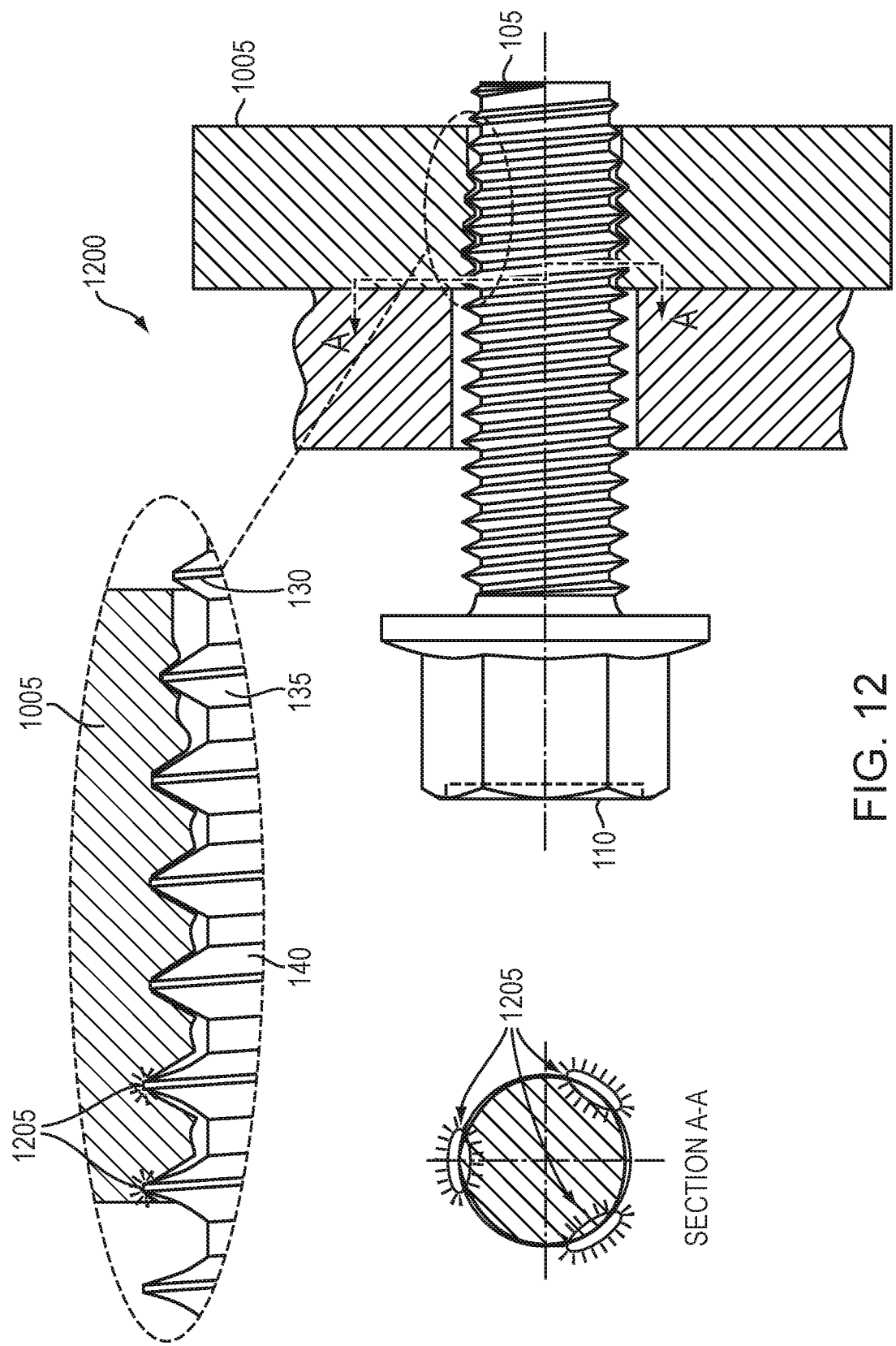
FIG. 12 is a cross-sectional view illustrating the insertion of a fastener into an unthreaded nut member in accordance with an illustrative embodiment of the present invention.

FIG. 12 is a cross-sectional view 1200 of the insertion of a fastener 100 into an unthreaded nut member 1005 in accordance with an illustrative embodiment of the present invention. The third zone threads 140 have now entered the previously formed threads and have generated tip penetrations at points 1205.

Figure 13:
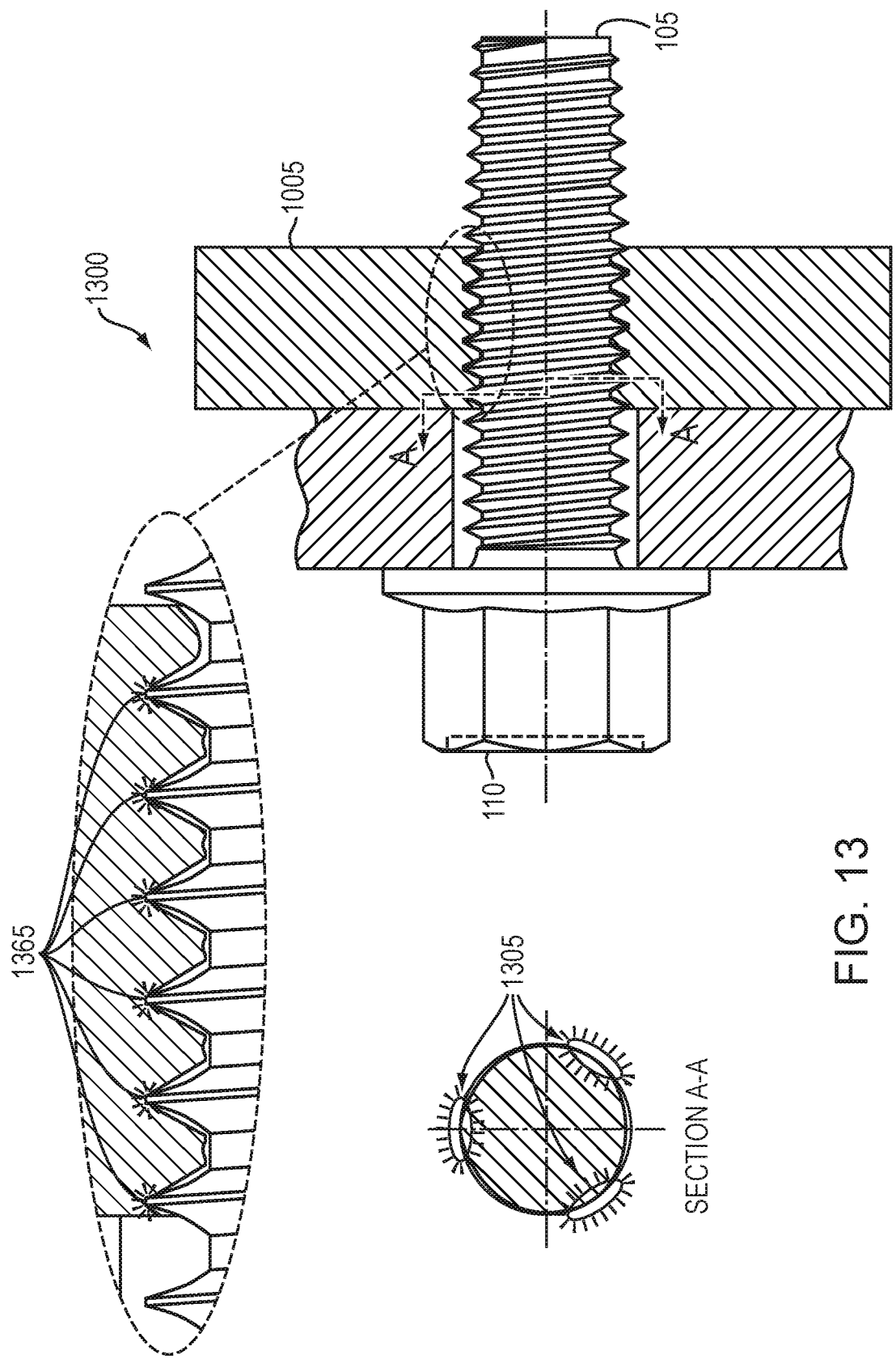
FIG. 13 is a cross-sectional view illustrating the insertion of a fastener into an unthreaded nut member in accordance with an illustrative embodiment of the present invention.

FIG. 13 is a cross-sectional view 1300 of the insertion of a fastener 100 into an unthreaded nut member in accordance with an illustrative embodiment of the present invention. In view 1300, the first and third zone threads have passed through the nut member 1005, a plurality of third zone threads are engaging the nut member 1005 at a plurality of tip penetration points 1305.

As noted above, in relation to FIGS. 6-9, in illustrative embodiments of the present invention, the first and second zone threads may be sized to create an optimally sized thread to achieve a desired mechanical interference with the third zone threads.

It should be noted that while the present invention has been described in relation to particular thread profiles, the principles of the present invention may be utilized with a variety of thread forming and/or thread locking thread profiles. As such, the specific descriptions of particular thread profiles contained herein should be viewed as exemplary only. Furthermore, while various descriptions of number of pitch threads in the various zones has been given, as will be appreciated by those skilled in the art, the number of pitches in the various zones may vary depending on intended uses. As such, the description of particular numbers of pitches in the various zones should be taken as exemplary.

The present description is written in terms of various illustrative embodiments of the present invention. As will be appreciated by those skilled in the art, various modifications may be made to the embodiments described herein without departing from the spirit or scope of the invention. As such, the described embodiments should be taken as illustrative only.

What is claimed is:

1. A fastener comprising:
   a shaft having a cross-sectional profile having an entrance point at a first end and a head at a second end, wherein the cross-sectional profile has three or more lobes
   wherein the shaft has inscribed thereon a first thread profile in a first zone and a second zone, wherein the first thread profile is a thread forming thread profile designed to generate internal threads in a nut member;
   wherein the first zone begins at the entrance point and extends for approximately a first predefined number of thread pitches along the shaft, wherein a diameter of the first zone increases from the entrance point to the second zone;

wherein the second zone has a constant outer diameter and extends for approximately a second number of predefined thread pitches, and a third zone having a second thread profile differing from the first thread profile extending from a transition from the second zone along a substantial portion of the remainder of the shaft towards a bottom of the head, wherein the second thread profile is a thread locking thread profile and wherein the second thread profile is sized based on knowledge of the first thread profile to create a desired amount of mechanical interference between the internal threads formed by the first thread profile and the second thread profile.

2. The fastener of claim 1, wherein the first thread profile has an approximately 60° angle.

3. The fastener of claim 1, wherein the first thread profile has an approximately radius thread profile.

4. The fastener of claim 1, wherein the first thread profile has an approximately parabolic thread profile.

5. The fastener of claim 1, wherein the cross-sectional profile is substantially circular.

6. The fastener of claim 1, wherein the first predefined number of thread pitches is three.

7. The fastener of claim 1 wherein the second predefined number of thread pitches is six.

8. The fastener of claim 1 wherein the first thread profile is a thread forming thread profile.

9. The fastener of claim 1 wherein the second thread profile is a thread locking thread profile.

10. The fastener of claim 1, wherein the first thread profile is sized to create an optimized internal thread for engagement with the second thread profile.

11. A fastener comprising:
a shaft having a cross-sectional profile having an entrance point at a first end and a head at a second end, wherein the cross-sectional profile of the shaft transitions from a substantially circular cross section to a substantially non-circular cross section;

wherein the shaft has inscribed thereon a first thread profile in a first zone and a second zone, wherein the first thread profile is a thread forming thread profile designed to generate internal threads in a nut member;

wherein the first zone begins at the entrance point and extends for approximately a first predefined number of thread pitches along the shaft, wherein a diameter of the first zone increases from the entrance point to the second zone;

wherein the second zone has a constant outer diameter and extends for approximately a second number of predefined thread pitches, and a third zone having a second thread profile differing from the first thread profile extending from a transition from the second zone along a substantial portion of the remainder of the shaft towards a bottom of the head, wherein the second thread profile is a thread locking thread profile and wherein the second thread profile is sized based on knowledge of the first thread profile to create a desired amount of mechanical interference between the internal threads formed by the first thread profile and the second thread profile.

12. A fastener comprising:
a shaft having a cross-sectional profile having an entrance point at a first end and a head at a second end, wherein the cross-sectional profile of the shaft transitions from a substantially non-circular cross section to a substantially circular cross section;

wherein the shaft has inscribed thereon a first thread profile in a first zone and a second zone, wherein the first thread profile is a thread forming thread profile designed to generate internal threads in a nut member;

wherein the first zone begins at the entrance point and extends for approximately a first predefined number of thread pitches along the shaft, wherein a diameter of the first zone increases from the entrance point to the second zone;

wherein the second zone has a constant outer diameter and extends for approximately a second number of predefined thread pitches, and a third zone having a second thread profile differing from the first thread profile extending from a transition from the second zone along a substantial portion of the remainder of the shaft towards a bottom of the head, wherein the second thread profile is a thread locking thread profile and wherein the second thread profile is sized based on knowledge of the first thread profile to create a desired amount of mechanical interference between the internal threads formed by the first thread profile and the second thread profile.

* * * * *